Figure 6:
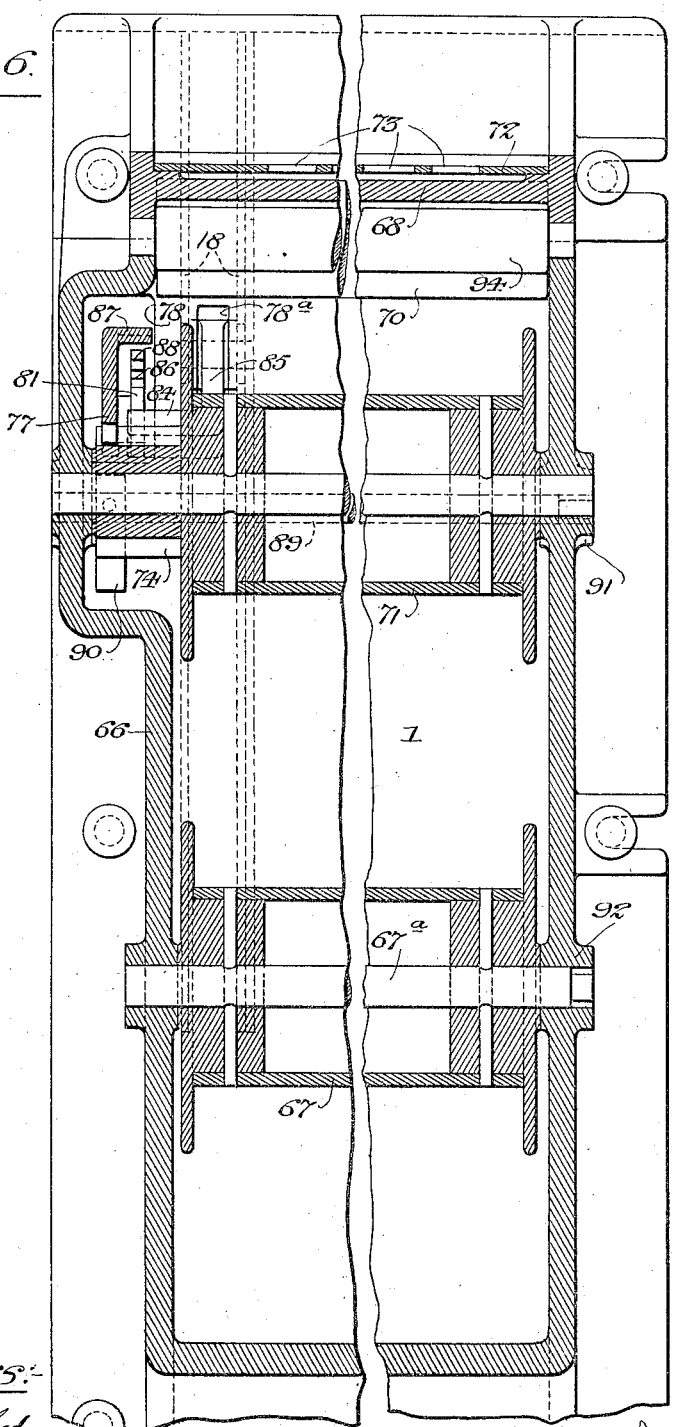

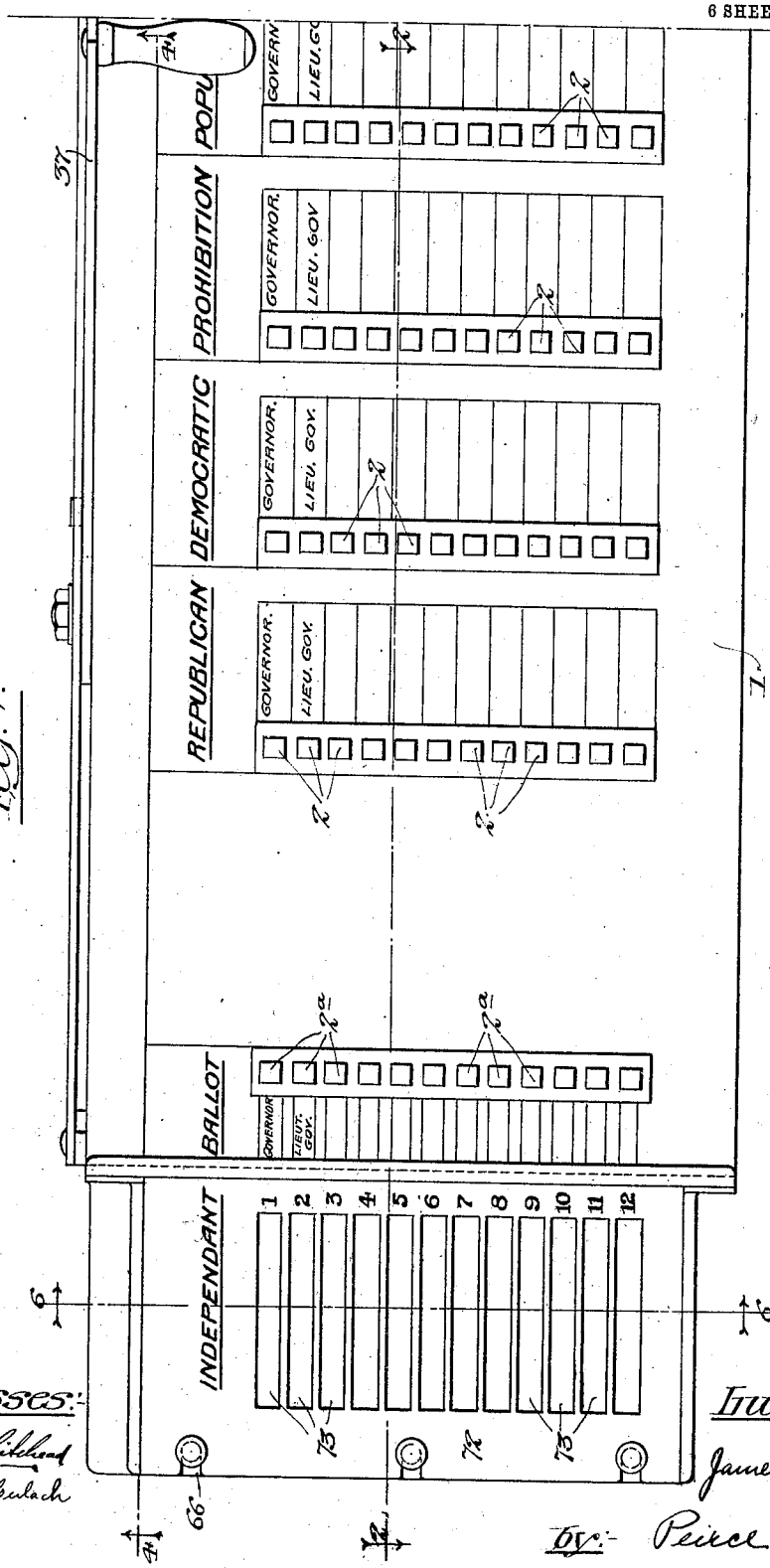

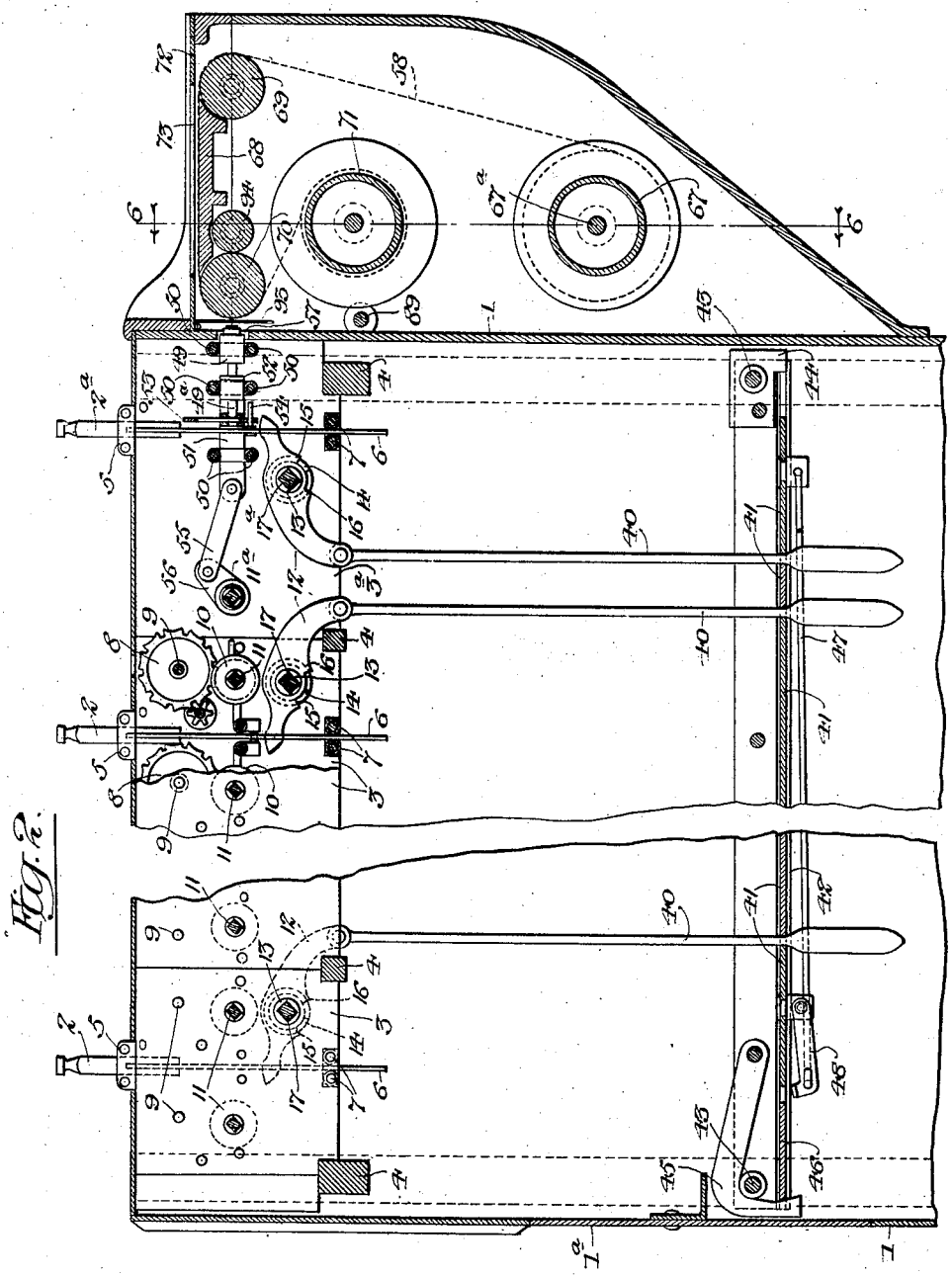

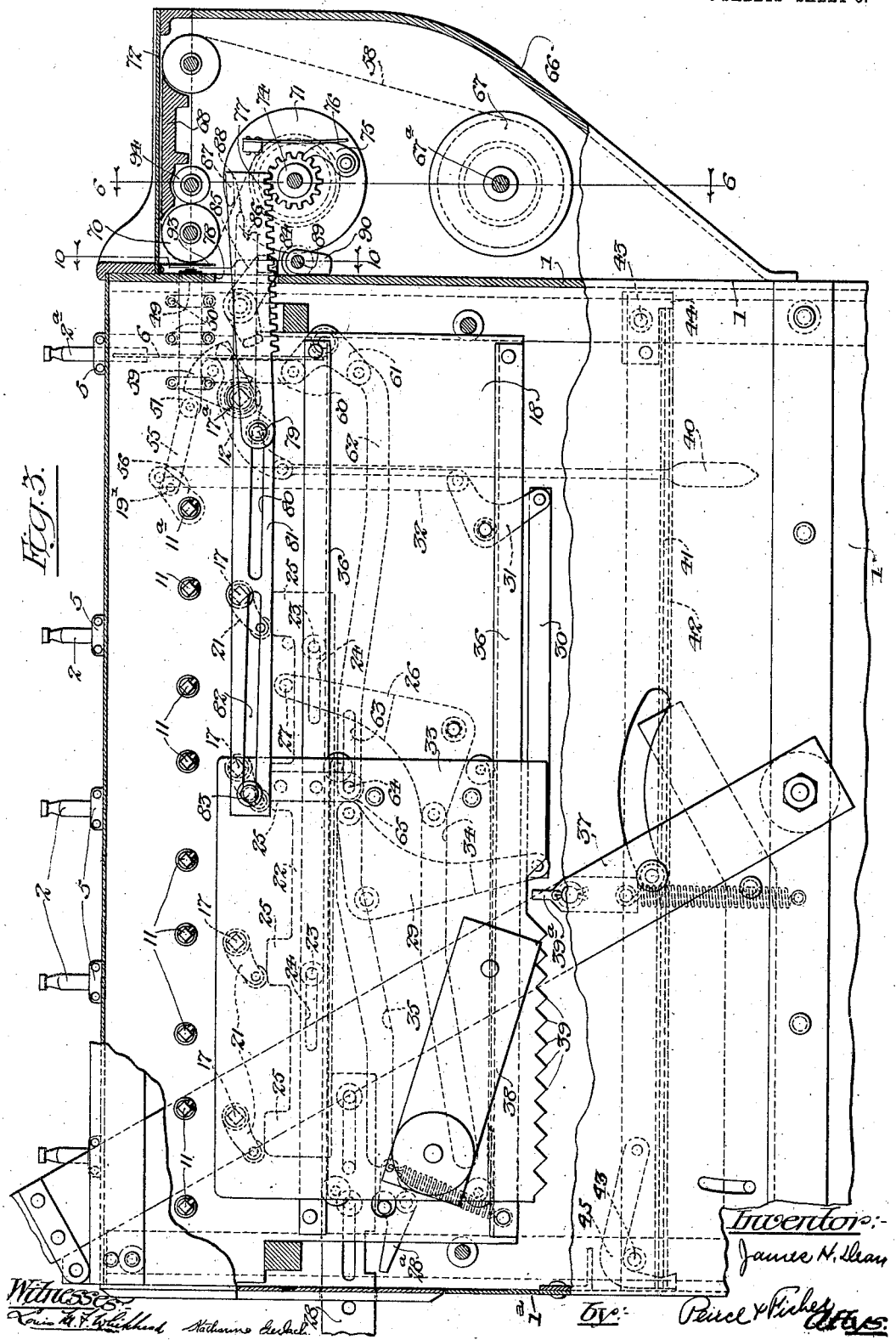

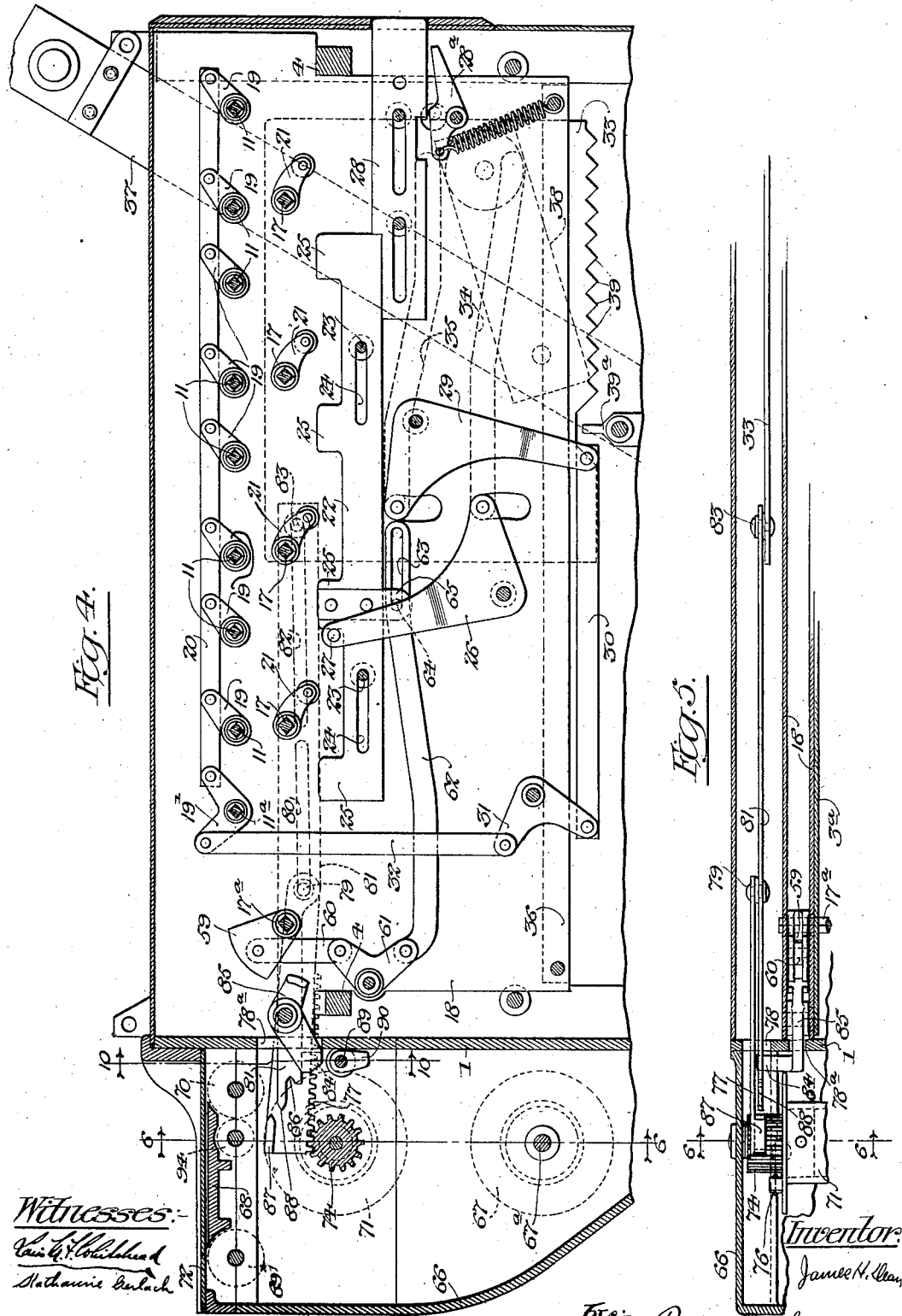

J. H. DEAN.
VOTING MACHINE.
APPLICATION FILED FEB. 29, 1908.

938,126.

Patented Oct. 26, 1909.
6 SHEETS—SHEET 5.

Witnesses:-
Inventor:-

J. H. DEAN.
VOTING MACHINE.
APPLICATION FILED FEB. 29, 1908.

938,126.

Patented Oct. 26, 1909.
6 SHEETS—SHEET 6.

Witnesses:

Inventor:—
James H. Dean
Pearl & Fisher
Attys.

UNITED STATES PATENT OFFICE.

JAMES H. DEAN, OF CHICAGO, ILLINOIS, ASSIGNOR, BY MESNE ASSIGNMENTS, TO EMPIRE VOTING MACHINE COMPANY, A CORPORATION OF NEW YORK.

VOTING-MACHINE.

938,126. Specification of Letters Patent. Patented Oct. 26, 1909.

Application filed February 29, 1908. Serial No. 418,436.

*To all whom it may concern:*

Be it known that I, JAMES H. DEAN, a citizen of the United States, and a resident of Chicago, county of Cook, and State of Illinois, have invented certain new and useful Improvements in Voting-Machines, of which the following is a specification.

The invention relates to voting machines in which a number of voting keys or ballot indicators are provided for the several candidates which may be moved by the voter to and from voted position to correct or change his vote at any time before the voting operation is finally completed.

The present invention more particularly relates to the means provided in accordance with the law in most of the States whereby a voter may cast a ballot for any candidate not regularly nominated and whose name does not appear upon the face of the machine.

Numerous forms of irregular voting mechanisms have heretofore been provided. One common form of such a mechanism consists of devices for supporting and feeding a web of paper behind an aperture or a series of apertures or slots in the casing of the machine. The apertures or slots correspond to the different offices to be filled and each is covered by a slide which is raised by the voter to write the name of the irregular candidate upon the paper web. The feeding devices are arranged to advance the paper web progressively at each operation of the machine in which the voter raises one or more of the slides. Each slide is interlocked with the regular candidate keys for the same office so that a single voter can cast but one vote for that office. In such constructions it is necessary to so arrange the interlocking mechanism that when a slide is once lifted it prevents any operation of the regular candidate keys, since otherwise the voter could cast a ballot both for an irregular candidate and for a regular candidate.

The present invention seeks to provide in connection with devices for feeding a web of paper or the like, voting devices for irregular candidates which may be moved to and from voted position to set and restore the interlocking mechanism so that the irregular voting devices, as well as those for the regular candidates, may be changed at will by the voter at any time before the voting operation is finally completed to correct or change his vote. The improved form of irregular voting mechanism is also so arranged that it is impossible for a voter to cast more votes, either in single candidate or multi-candidate groups, than he is entitled to under law.

The invention consists in the features of construction, combinations and arrangements of parts, hereinafter set forth, illustrated in the accompanying drawings, and more particularly pointed out in the appended claims.

The invention is illustrated as applied to the flat or horizontal type of voting machine such as set forth in a prior application filed by me December 27, 1904, Serial No. 238,388. It will be understood, however, that the invention may be applied to other forms of machine without departure from the essentials of the invention.

In the drawings, Figure 1 is a plan view of a voting machine to which the present improvement is applied. Fig. 2 is a transverse section on the line 2—2 of Fig. 1. Fig. 3 is a rear view of the machine with the back plate broken away to show the operating mechanism. Fig. 4 is a transverse section on line 4—4 of Fig. 1 illustrating the operating mechanism. Fig. 5 is a detail plan section of parts shown in Fig. 4. Fig. 6 is a detail section on the lines 6—6 of Figs. 1 to 5 inclusive. Fig. 7 is a detail view of one of the unit sections of the machine that is provided with irregular voting keys or ballot indicators and with devices controlled by said keys or indicators. Parts of Fig. 7 are shown in section on the line 7—7 of Fig. 8. Figs. 8 and 9 are detail sections on the lines 8—8 and 9—9 respectively of Fig. 7. Fig. 10 is a detail section on the lines 10—10 of Figs. 3 and 4. Fig. 11 is a detail view of parts shown in Figs. 3 and 4 but in changed position.

As in the construction shown in the prior application referred to, the machine is provided with a box-like frame or casing 1 upon the uper flat face of which the names of the regularly nominated candidates are arranged, preferably in office rows and in party columns. The corresponding voting keys 2 are arranged at the upper ballot face of the machine in rows and columns which, as stated, preferably correspond to the different offices and the different party tickets respectively. As in the prior construction the keys 2 are mounted for convenience in manufacture and in making repairs in units or sections each of which comprises two connected side plates 3 and which are arranged at the upper portion of the frame or casing 1 upon supports 4 that extend from front to rear of the machine. The keys or ballot indicators 2 move longitudinally through guides 5 at the upper portions of the unit sections and are shifted vertically to and from voted position. Each key is provided with a tail piece 6 that moves between a pair of guides 7 at the lower portion of the unit section. Each section is provided with two keys and with two counters that are arranged on opposite sides of the keys and comprise sets of counter wheels 8 mounted on cross-pins 9. The unit wheel of the counter is provided with a Geneva stop gear that is arranged to be engaged by a Geneva stop actuator 10. The actuators 10 are connected to the tail portion 6 of the keys to be shifted axially thereby into and out of operative relation with the corresponding counters. The actuators 10 of the different sections are arranged in line and a series of actuator shafts 11 extend through them. These actuator shafts 11 are oscillated by the operating mechanism of the machine to advance the counters corresponding to the voted keys one step. The Geneva stop actuators 10 are at all times interlocked with the counters so that the latter cannot be moved independently of the actuators. The movement of the keys to and from voted position merely serves to shift the actuators into and out of operative relation with the counters and the latter are advanced one step for each voted key by the movement of the actuator shafts 11 so that after a key has been voted, it may be retracted before the operation of the machine is completed, to correct or change a vote.

Each key is arranged to engage one end of a rock arm 12 that is loosely mounted upon a hub 13 journaled between the side plates 3 of the counter section. The hubs are provided with projecting lugs 14 arranged between a pair of shoulders 15 and 16 on the corresponding rock arm 12. The hubs 13 of the different unit sections are arranged in line and are provided with square openings through which extend a set of restoring shafts 17. These shafts are controlled by the operating mechanism and are normally held in the positions shown in Fig. 2 with the lugs 14 on the hubs 13 engaging the shoulders 15 of the rock arms and holding and rocking the latter and the keys connected thereto in normal unvoted position. When a voter is admitted to the machine these shafts are unlocked so that he may vote the keys. At the completion of the operation of the machine the shafts 17 are rocked to restore and lock the keys and counter actuators in normal unvoted position. The lugs 15 and 16 on the rock arm 12 are spaced apart for a distance greater than the width of the lugs 14 so that the keys have a lost motion connection with the restoring shafts 17 and so that the independent operation of the keys is permitted while any of the keys that have been voted will be restored at the end of the operation of the machine by the movement of the shafts.

The actuator shafts 11 and the restoring shafts 17 are controlled by the operating mechanism at the rear portion of the machine, as shown in Figs. 3 and 4. The operating mechanism is arranged in a section comprising side plates 18 that are connected together and extend the entire width of the machine. The actuator shafts 11 engage a series of rock arms 19 journaled between the side plates 18 of the main operating section and are connected together by a common bar or link 20. The restoring shafts 17 engage a series of rock arms 21 journaled between the side plates 18 of the main operating section and controlled by a shiftable locking and restoring bar 22. This bar is mounted in the main operating section upon a pair of pins 23 which engage slots 24 in the bar so that the latter may be moved longitudinally to a limited extent. The locking and restoring bar 22 is provided with a series of lugs 25 that normally engage the rock arm 21 and hold the restoring shafts 17 and the voting keys controlled thereby against movement. The movement of the locking and restoring bar 22 is effected in one direction by a bell-crank 26 that is journaled between the side plates 18 of the main operating section, and which is provided with a pin 27 arranged to engage one of the lugs 25. The locking and restoring bar 22 is moved in one direction by the pin 27 on the bell-crank 26 to restore and lock the keys in normal position. The bar is shifted in the opposite direction to unlock the keys by a judge's intervening bar 28 that is mounted to slide longitudinally in one end of the main operating section and which projects through the casing of the machine at the back portion thereof.

The movement of the actuator shafts 11 is controlled by a bell-crank 29 journaled between the side plates 18 of the main operating section and connected by a link 30 to a small bell-crank 31 that is journaled between the side plates of the main operating section and connected by a link 32 to one of the rock arms 19' that is in the form of a bell-crank. The movement of the operating bell-cranks 26 and 29 is controlled by a sliding cam plate 33 having slots 34 and 35 which engage respectively with pins or rollers on the bell-cranks 26 and 29 and which project through slots in the outer side plate 18 of the main operating section. The carriage or cam plate 33 is mounted to slide upon a pair of rails 36 fixed to the back of the main operating section and is shifted back and forth by a main operating lever 37 that is connected thereto by a link 38. The cam plate is provided on its lower edge with ratchet teeth 39 that are arranged to be engaged by a full stroke dog 39ª to compel the complete shift of the carriage in one or the other directions.

The main operating lever and carriage are normally at the left of the machine, or at the right thereof when viewed from the rear, as in Fig. 3. When the voter is admitted to the machine he shifts the operating lever to the right and moves the carriage to the position shown in the drawings. This rocks the actuator shafts 11 and moves the bell-crank 26 to release the locking and restoring bar 22. The cam plate 33 at the end of its movement also releases a latch 28ª which normally locks the judges' intervening bar 28 so that the latter may be pushed in to shift the locking and restoring bar 22 to carry the lugs 25 thereon away from the rock arms 21 on the locking and restoring shafts 17. The voter may then indicate his choice as desired by the operation of the voting keys. He may change the ballot indicators or keys as he desires at any time before leaving the machine and at any time before he completes the voting operation. To do this he restores the main operating carriage by means of the operating lever 37 so that the actuator shafts 11 are rocked back to normal position and the locking and restoring bar 22 is subsequently moved by the bell-crank 26 to restore and lock the keys and key-controlled counter-actuators in normal position.

The parts thus far described are set forth and claimed in the prior application referred to by me and in another application, Serial No. 365,639, filed by me April 1, 1907, and need not be more fully described here. The actuators may be arranged to advance the counters corresponding to the voted keys as the voter leaves the machine, as set forth in application No. 238,388, filed December 27, 1904 in which instance the actuators would be normally out of operative relation with their counters and would be shifted into operative relation by the depression of the corresponding keys to voted position, or the actuators may be arranged normally in operative relation with the counters, as set forth in application No. 365,639, filed April 1, 1907, in which instance all of the counters are advanced as the voter is admitted to the machine and the depression of any key to voted position moves its actuator out of operative relation with the corresponding counter so that all of the counters, except those corresponding to the voted keys, are moved back one step when the voter leaves the machine.

The interlocking mechanism comprises a series of arrows or spreaders 40 that are connected at their upper ends to the tail portions of the rock arm 12 and extend downwardly into engagement with the interlocking blocks 41. There is a row of these blocks for each office row of keys and they are mounted to slide in channels or guides 42 that are fixed at their ends to rods 43. Each channel is provided at one end with a stop 44 and at its opposite end with a pivoted hook 45 that extends down into line with the corresponding row of interlocking blocks 41. These hooks may be raised, when a door 1ª at the side of the machine is removed, and a suitable limiting block 45 inserted between the hooks and the end blocks of the rows to limit the movement of the blocks. For example, a limiting block of such length may be inserted that only a single spreader in the corresponding row can be moved into position between the blocks and but one of the keys of that row can be left in voted position. By restoring or retracting any key after it has been voted, the voter also restores the corresponding spreader so that he then may cast a vote for another candidate for the same office but he cannot cast more than one vote in a single office group. One end block in each row is connected by a link or rod 47 to a dog 48 that is pivoted to the opposite end block in the next adjacent row. By this means two or more adjacent rows may be connected together and their movement properly limited for inserting a grouping block of proper size in the last row of the group for multi-candidate voting. The voter may then cast the proper number of votes in that group and can, at any time before completing the operation of the machine, correct or change his vote as desired, but cannot in any event cast votes for more candidates than he is entitled to do under the law.

The interlocking mechanism above described is set forth and claimed in an application filed in the United States Patent Office on September 17, 1908. Serial No. 453,476.

At one side of the machine (see Fig. 1) is arranged a row of keys 2ª for voting for candidates not regularly nominated and whose names do not appear upon the ballot on the face of the machine. There is one of these irregular ballot indicators or voting keys for each office line of regular candidate keys and they are mounted in unit sections in a similar manner. That is to say, there are two of these irregular candidate keys 2ª in each section that is formed of side plates 3ª (see Figs. 7, 8 and 9). Each of these keys, like the regular candidate keys 2, is provided with a tail portion 6 and is arranged to shift in guides 5 and 7. The locking and restoring rock arms 12 and shafts 17 are also entirely similar to the like parts for the regular candidate keys, except that the position of the rock arms is reversed for the sake of compactness, as clearly shown in Fig. 2.

Each irregular key 2ª is arranged to control a printer or impression device in the form of a printing plunger 49 that is mounted to shift in horizontal direction between guide rolls 50 mounted between the side plates 3ª of the sections. An actuating plunger 51 is provided for the two printers or impression devices of each section of the irregular voting mechanism. This actuating plunger 51 slides between the guide rolls 50 and is provided at its outer end with projecting lugs 52 that are arranged to engage and retract the printing plungers 49. The actuating plunger is also provided on each side with a pair of lugs 52ª between which is arranged a coupling device 53 in the form of a slotted bar or plate. These coupling devices 53 move horizontally with the actuating plungers 51 and are also connected by pins 54 to move vertically with the irregular voting keys 2ª. The pins 54 are fixed to the keys and slide loosely through holes in the lower ends of the coupling devices 53 so that the latter can move both horizontally and vertically as described.

The actuating plungers 51 are connected by links 55 to rock arms 56 that are journaled between the side-plates 3ª of the section. The hubs of these rock arms are arranged in line and through them extend an actuator shaft 11ª which is oscillated by the operating mechanism with the other actuator shafts 11 of the machine. The shaft 11ª is thus oscillated back and forth at each operation of the machine and at the same time the actuating plunger 51 is reciprocated in horizontal direction. If the irregular candidate keys 2ª are left in their normal raised or unvoted position the slotted portions of the coupling device 53 will be in line with the stems 49ª of the printing plungers 49 so that the latter will not be shifted by the movement of the actuating plunger 51. If any of the irregular voting keys, however, have been depressed to voted position it will bring a blank portion of the coupling bar or link 53 opposite the stem 49ª of the corresponding printer plunger so that the latter will be reciprocated as the voter leaves the machine and will be forced outwardly through an opening 57 in the side plate of the machine to mark or make an impression upon a paper web 58.

Inasmuch as the locking and restoring shaft 17ª for the irregular candidate keys 2ª operates in a direction the reverse of that of the other locking and restoring shafts 17, it cannot be directly controlled by one of the lugs 25 on the locking and restoring bar 22. As shown in Figs. 3, 4 and 5, the rear end of this locking and restoring shaft 17ª engages a segment-shaped arm 59 journaled between the side-plates 18 of the main operating section. This arm is connected by a link 60 to a bell-crank 61 journaled in the main operating section, and a link 62 connected at one end to the bell-crank 61 is provided at its opposite end with a longitudinal slot 63 that engages a pin 64 on a lug 65 depending from the locking and restoring bar 22. When the locking and restoring bar is in normal position, shown in Fig. 3, the pin 64 is in the outer end of the slot 63 and the locking and restoring shaft 17ª and the irregular candidate keys 2ª controlled thereby are held against movement. When the voter enters the machine and shifts the carriage to unlock the judges' intervening bar 28, the latter is pushed in, as stated to shift the locking and restoring bar 22 to the position shown in Fig. 4. The voter may then operate any of the irregular candidate keys. Any such keys which have been voted are restored, as the voter leaves the machine, by the movement of the bell-crank 26 and the locking and restoring bar 22.

The portions of the irregular mechanism thus far described are similar to the corresponding portions of the irregular mechanism set forth and claimed in an application filed by me in the United States Patent Office on July 25, 1905, Serial No. 271,216.

The paper web 58 and the feeding devices therefor are arranged, in the form shown, in a supplemental casing 66 secured to the side of the main casing. At the lower portion of the casing 66 is journaled a supply roll 67 for the web of paper. At the upper portion of the casing is arranged a flat supporting plate 68 and a pair of guide rolls 69 and 70 at the opposite edges thereof. The paper web passes from the supply roll 67 over the guide roll 69 onto the supporting plate 68 and thence over the guide roll 70 onto a receiving roll 71 journaled in the casing 66 below the supporting plate 68. The casing 66 is provided with a top plate 72 that is removably secured in position thereon and is provided with a series of slots or apertures 73 which correspond to and are arranged opposite the irregular candidate keys 2ᵇ and which are preferably correspondingly numbered. A slot or aperture is thus provided for each irregular voting key and for each office to be filled and the paper web is securely held in place upon the supporting plate 68 behind the aperture so that the voter may write the name or names of any independent candidate or candidates upon the paper web and in a position thereon which will identify such name or names with the proper office or offices. Instead of having a number of apertures a single aperture, equal in length to the entire column of irregular candidate keys, could be provided in the top plate 72 and the paper web could be ruled so as to divide it into spaces corresponding to the different offices to be filled at the election and in correspondence, of course, with the arrangement of the irregular candidate keys.

To cast a vote for a candidate not regularly nominated for any office, the voter must not only write his name upon the paper web opposite the key corresponding to that office but he must also depress such irregular candidate key to voted position so that, as he leaves the machine, the paper web will be marked by the corresponding printer opposite the name of the candidate that has been written upon the paper web. Unless the paper web is so marked the vote cast will not be counted.

The irregular candidate keys, like the other keys of the machine, are provided with interlocking arrows that, in a similar manner, are connected to and shifted by the rock arms 12 which in turn are moved back and forth by the keys as the latter are moved to and from voted position. The irregular candidate keys are thus interlocked with the regular candidate keys and a voter cannot cast more votes than he is entitled to for either regular or irregular candidates. Inasmuch, however, as the irregular candidate keys do not directly operate the corresponding printers but merely serve to place them into and out of position for operation, the indication of a vote for an independent candidate may be changed or corrected in the same manner as that for one of the regular candidates, that is, by restoring the voted irregular key to release the interlocking mechanism and then depressing or placing in voted position any other of the keys of candidates for the same office. Suitable mechanism is provided for advancing the paper web at the end of each voting operation of the machine in which one or more of the irregular candidate keys 2ª have been depressed. For this purpose, a gear pinion 74 is loosely mounted on one end of the shaft of the receiving roll 71. The pinion when rotated in one direction is arranged to advance the receiving roll 71 through the medium of a pawl 75 pivoted to the end of the roll and yieldingly held into engagement with the pinion by a spring 76. The pinion is oscillated by a rack bar 77. The pinion 74 and rack bar 77 are located at the rear of the machine and the rack bar projects through an opening 78 formed in the side wall of the main casing 1. The inner end of the rack bar is provided with a pin 79 that engages a longitudinal slot 80 in an actuator bar 81. The inner end of the actuator bar is provided with a second longitudinal slot 82 which engages a pin 83 on the end of the cam plate or carriage 33. The outer end of the actuator bar 81 extends through the opening 78 and rests upon a lug 84 that is fixed to and projects rearwardly from one arm of a bell-crank 85 (see Figs. 3, 4 and 5). This bell-crank is pivoted between the side plates 18 of the main operating section and its outwardly projecting or longer arm normally rests against the lower edge of a slot or opening 78ª. The inwardly projecting, shorter arm of the bell-crank 85 is arranged in the path of movement of the segment-shaped arm 59 on the rocking and restoring shaft 17ª.

The reciprocation of the carriage or cam plate 33 will, by the engagement of the pin 83 thereon with the ends of the slot 82 in the actuator bar, move the actuator bar back and forth at each operation of the machine. The lost motion or pin-and-slot connections, however, between the cam plate and the actuator bar 81, and between the latter and the rack bar 77 are such that, in the ordinary operation of the machine, the rack bar will not be moved. After a voter has shifted the cam plate or carriage to place the machine in condition for voting, the cam plate 33, actuator bar 81 and rack bar 77 will be in the position shown in the drawings. If the voter then depresses any of the irregular candidate keys to cast a vote for an independent candidate, he will shift the shaft 17ª and bring the segment arm 59 thereon against the short arm of the bell-crank 85 so that the latter will be shifted and will, through the medium of the lug 84 thereon, lift the outer end of the actuator bar 81 to bring a seat 86 on the end of the bar in line with an inwardly-projecting lug 87 on the end of the rack bar 77. Then when the voter leaves the machine and shifts the cam plate or carriage back to normal position, the rack bar 77 will move outwardly with the actuator bar and thus rotate the receiving roll 71 to advance the paper web 58 and bring a fresh portion thereof beneath the apertures or slots 73. At the beginning of the next operation of the machine, the movement of the cam plate or carriage 33 will move both the actuator bar on the rack bar back to the position shown in the drawings. This back shift of the rack bar 77 will rotate the gear pinion 74 which, however, moves idly beneath the end of the bar 75, so that the receiving roll 71 and paper web are left in the position to which they were advanced upon the forwarding shift of the rack bar. To secure the proper engagement of the actuator bar with the rack bar whenever one of the irregular candidate keys is voted, the actuator bar is provided, above the seat 86 with a projecting finger 88 having a beveled outer edge which coöperates with the beveled inner edge of the lug 87 on the rack bar. By this arrangement, if an irregular candidate key is depressed far enough to set the corresponding printer for actuation, even though it may not be depressed to its full extent, the beveled edge of the finger 88 will be raised above the beveled edge of the lug 87 and the actuator bar will properly engage the rack bar to operate the latter and advance the paper web.

It is obvious that the paper feed devices will only be actuated when one of the irregular candidate keys is placed in voted position. To permit the rewinding of the roll at the end of an election means are provided for raising the rack bar 77 out of engagement with the pinion 74 so that the latter is free to rotate with the receiving roll. For this purpose a shaft 89 is journaled in the casing 66 below the end of the rack bar 77 and is provided beneath the rack bar, with an arm 90. The outer end of the shaft 89 is arranged within a boss or projection 91 on the front plate of the casing 66 and is squared or properly shaped to engage a proper operating key or handle so that at the end of the election the proper officer, through the aid of such a key or handle, could turn the shaft 89 to bring the arm 90 thereon into the position shown in Fig. 11 so as to hold the rack bar 77 out of engagement with the teeth of the pinion 74. The shaft 67ª of the supply roll 67 has its forward end arranged within a boss or projection 92 on the front wall of the casing 66 (see Fig. 6) and the end of the shaft within the boss or projection is squared or properly shaped to fit a special key or handle so that, the proper officer, through the aid of such a special key or handle, may rewind the web of paper to ascertain what votes, if any, have been cast for independent candidates. Votes for such candidates, of course, will only be counted when the candidate's name written on the paper web is validated by the mark or impression of the printing plunger or impression device for the corresponding office. The printers or impression devices are preferably designed to mark different numbers or characters distinctive of the different offices to be filled at the election. For example, the type on the printing plungers may represent the numbers corresponding to those on the irregular candidate keys and those opposite the slot 73 in the plate 72.

The printing devices or impression plungers are arranged to mark the portion of the web that extends over the guide roll 70 so that the latter acts as a platen against which the impression is made. A suitable inking ribbon 93 (see Fig. 2) is preferably interposed between the printer plungers and the roller 70. To support the roller 70 so that it may properly receive the impression of the printing devices, a bracing roller 94 is arranged in front and in contact therewith.

It is obvious that the irregular, as well as the regular voting mechanism may be retracted or reset to correct or change a vote at any time before the final voting operation is completed. It is also obvious that the voter cannot repeat.

Changes may be made in the details set forth without departure from the essentials of the invention.

Having described my invention, what I claim as new and desire to secure by Letters Patent, is:—

1. In a voting machine, the combination of a casing having an aperture therein, means for supporting and feeding a paper web behind said aperture, a set of printers for marking said paper web and a set of keys controlling the operation of said printers, substantially as described.

2. In a voting machine, the combination of a casing having an aperture therein, a paper support behind said aperture, paper feed mechanism for progressively feeding a web of paper over said support at different operations of the machine, impression devices corresponding to the different offices for marking the web of paper, a set of voters' keys corresponding to said set of impression devices and movable to and from voted position to set said impression devices into and out of operative condition, and means independent of said keys for operating said impression devices, substantially as described.

3. In a voting machine, the combination with a casing having an aperture, a supporting plate behind said aperture, a supply roll for a web of paper arranged within said casing, feed roll mechanism for moving the web of paper from said supply roll over said supporting plate, a set of printers for marking the web of paper, mechanism for actuating said printers, and a set of controlling keys for placing said printers into and out of operative relation with the printer actuating mechanism, substantially as described.

4. In a voting machine, the combination with a casing having an aperture therein, a paper support behind said aperture, mechanism for feeding a web of paper progressively over said support at different operations of the machine, a set of printers or impression devices for marking the web of paper, a set of voting devices movable by the voter to and from voted position and arranged to place said printing devices into and out of operative condition, and mechanism independent of said keys for effecting the impression of said printing devices upon the paper web, substantially as described.

5. In a voting machine, the combination with a casing having an aperture therein, of a paper support behind said aperture, roller mechanism for effecting the progressive feed of a web of paper over said paper support at the different operations of the machine, a number of impression devices for marking the web of paper, a corresponding number of voting keys for placing the impression devices into and out of operative condition, and mechanism independent of said keys for effecting the impression of said devices upon the paper web, substantially as described.

6. In a voting machine, the combination of a casing having an aperture therein, a supporting plate behind said aperture, a supply roll for a web of paper arranged within said casing, feed roll mechanism arranged within said casing for progressively shifting the web of paper from said supply roll over said supporting plate at the different operations of the machine, a number of printers for marking the paper web, a corresponding number of voting keys freely shiftable to and from voted position and arranged to place said printers into and out of operative condition and mechanism independent of said keys for effecting the impression upon the paper web of the printers corresponding to the keys left in voted position, substantially as described.

7. In a voting machine, the combination of a casing having an aperture therein, a support for a paper web behind said aperture, feed roll mechanism for progressively feeding a web of paper over said support at different operations of the machine, a set of printers for marking the paper web, actuating mechanism for said printers and a set of controlling keys movable to and from voted position and arranged to connect and disconnect said printers and the actuating mechanism therefor, substantially as described.

8. In a voting machine, the combination of a casing having an aperture therein, a supporting plate behind said aperture, a supply roll for a web of paper arranged within said casing, feed roll mechanism in said casing arranged to effect the progressive feed of the web of paper from said supply roll over said supporting plate at different operations of the machine, a set of printing plungers for marking the web of paper, actuating devices for said set of plungers, a corresponding set of voting keys freely movable to and from voted position, and coupling devices actuated by said keys for connecting and disconnecting said printing plungers and the actuating devices therefor, substantially as described.

9. In a voting machine, the combination of a casing having an aperture therein, means for supporting and progressively feeding a web of paper behind said aperture, a set of impression devices for marking the web of paper, a corresponding set of vote indicators controlling but not directly operating said impression devices, and mechanism independent of said vote indicators for effecting the marking of the paper web by said impression devices, substantially as described.

10. In a voting machine, the combination of a casing having an aperture therein, a supporting plate behind said aperture, roll mechanism for effecting the progressive feed of a web of paper over said supporting plate at different operations of the machine, a set of printers for marking the web of paper, a corresponding set of vote indicators arranged to place said printers into and out of voted condition, and actuating mechanism independent of said vote indicators for effecting the impression upon the paper web of the printers that have been set in voted condition, substantially as described.

11. In a voting machine, the combination of a casing having an aperture therein, a supporting plate for a web of paper behind said aperture, a supply roll for a web of paper arranged in said casing, feed roll mechanism in said casing for effecting the progressive movement of the web of paper over said supporting plate at different operations of the machine, a set of printers for marking the paper web, mechanism for actuating said printers, a set of vote indicators, said vote indicators being freely movable to and from voted position, and coupling devices operated by said vote indicators for connecting and disconnecting the corresponding printers from the actuating mechanism therefor, substantially as described.

12. In a voting machine, the combination with a casing having an aperture therein, of means in said casing for supporting and progressively feeding a web of paper behind said aperture, a set of printing devices for marking said paper web, a set of irregular candidate keys or vote indicators controlling the operation of said printing devices, a set of regular candidate keys or vote indicators, counters controlled by said regular candidate keys or vote indicators, and interlocking mechanism interposed between said regular and said irregular candidate keys or vote indicators, substantially as described.

13. In a voting machine, the combination with a number of regular candidate keys and counters corresponding thereto, of a set of irregular candidate keys, interlocking mechanism interposed between said regular and said irregular candidate keys, all of said keys being movable to and from voted position to correct or change a vote, a set of impression devices controlled by said irregular candidate keys and arranged to be set thereby into and out of operative condition, means for effecting the progressive feed of a web of paper past said impression devices, and operating mechanism for effecting the marking of the paper web by the impression devices that have been set in operative condition, substantially as described.

14. In a voting machine, the combination of a casing having an aperture therein, a support behind said aperture, feed roll mechanism for effecting the progressive movement of a web of paper over said support at different operations of the machine, a set of impression devices for marking the web of paper, actuating mechanism for said impression devices, a set of irregular vote indicators for connecting and disconnecting the corresponding impression devices and the actuating mechanism therefor, a set of regular vote indicators, counters controlled thereby, and interlocking mechanism interposed between the regular and the irregular vote indicators, all of said indicators being movable to and from voted position to correct or change a vote, substantially as described.

15. In a voting machine, the combination with feed mechanism for a web of paper, of a set of irregular candidate vote indicators, printers controlled thereby and means controlled by said vote indicators for setting said paper feed mechanism into operative condition, substantially as described.

16. In a voting machine, the combination of feed mechanism for effecting the progressive movement of a web of paper at different operations of the machine, a set of impression devices for marking the web of paper, a set of controlling vote indicators movable to and from voted position to correct or change a vote, and means controlled by said vote indicators for throwing said feed mechanism into operation, substantially as described.

17. In a voting machine, the combination of a set of irregular vote indicators, a set of impression devices controlled but not directly actuated thereby, mechanism for effecting the progressive feed of a web of paper past the said impression devices, means controlled by said irregular vote indicators for throwing said paper feed mechanism into operation and mechanism independent of said keys for effecting the marking of the paper web by said impression devices, substantially as described.

18. In a voting machine, the combination of a set of irregular vote indicators movable to and from voted position to correct or change a vote, a set of impression devices arranged to be placed into and out of operative condition by said irregular vote indicators but not directly operated thereby, mechanism for effecting the progressive feed of a web of paper past said impression devices, means controlled by said indicators for throwing said feed mechanism into operative condition, and actuator mechanism independent of said irregular vote indicators for effecting the marking of the paper web by the impression devices corresponding to the vote indicators, substantially as described.

19. In a voting machine, the combination with feeding devices for effecting the progressive movement of a web of paper, a set of impression devices for marking the web of paper, a set of vote indicators movable to and from voted position for placing said impression devices into and out of operative condition, actuating mechanism for effecting the operation of said paper feeding devices and for effecting the marking upon the paper web of the impression devices corresponding to the vote indicators left in voted position, and means controlled by said irregular vote indicators for connecting said actuator mechanism and said paper feeding devices, substantially as described.

20. In a voting machine, the combination of feed roll mechanism for effecting the progressive feed of a web of paper at different operations of the machine, a set of printers for marking the web of paper, actuator mechan for said set of printers and said paper feed roll mechanism, and a set of irregular vote indicators movable to and from voted position and arranged to connect said printers and said feed roll mechanism with said actuator mechanism and to disconnect said printers therefrom, substantially as described.

21. In a voting machine, the combination with a casing having an aperture therein, a support behind said aperture, feeding devices for effecting the progressive movement of a web of paper over said support at different operations of the machine, a set of printers for marking the web of paper, a corresponding set of irregular vote indicators, each movable to and from voted position and arranged to place one of said printers into and out of operative condition, mechanism for operating said printers and said paper feeding devices, and means controlled by all of said irregular vote indicators for connecting said paper feeding devices and said operating mechanism, substantially as described.

22. In a voting machine, the combination of a casing having an aperture therein, a supporting plate behind said aperture, feeding devices for effecting the progressive movement of a web of paper over said supporting plate, a set of printers for marking the web of paper, a set of irregular candidate keys, operating mechanism for said printers and said paper feeding devices, a set of coupling devices operated individually by said set of irregular candidate keys for connecting and disconnecting the corresponding printers and said operating mechanism, and a coupling device operated by all of said keys for connecting said paper feeding devices and said operating mechanism, substantially as described.

23. In a voting machine, the combination with a set of regular candidate keys, of a set of irregular candidate keys, interlocking mechanism between said regular and said irregular candidate keys, all of said keys being movable to and from voted position to correct or change a vote, a set of printers controlled but not directly operated by said set of irregular candidate keys, feeding devices for effecting the progressive movement of a web of paper past said printers, operating mechanism for said printers and said paper feeding devices, and means controlled by said irregular candidate keys for connecting said operating mechanism and said paper feeding devices, substantially as described.

24. In a voting machine, the combination of a casing having an aperture therein, a supporting plate behind said aperture, feeding devices for effecting the progressive movement of a web of paper over said supporting plate, a set of printers for marking the web of paper, a corresponding set of irregular candidate keys, operating mechanism for said printers and said paper feeding devices, a set of coupling devices operated by said irregular candidate keys for connecting and disconnecting the corresponding printers and said operating mechanism, a common coupling device operated by all of said irregular candidate keys for connecting said operating mechanism and said paper feeding devices, a set of regular candidate keys, counters controlled thereby, and interlocking mechanism interposed between said regular candidate keys and said irregular candidate keys, all of said keys being movable to and from voted position to correct or change a vote, substantially as described.

JAMES H. DEAN.

Witnesses:
ELLA HAGENON,
KATHARINE GERLACH.